(12) United States Patent
Kim et al.

(10) Patent No.: US 8,249,655 B2
(45) Date of Patent: Aug. 21, 2012

(54) UNIVERSAL SERIAL BUS BASED SUBSCRIBER IDENTITY MODULE

(75) Inventors: Byoung-Jo Kim, Morganville, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 665 days.

(21) Appl. No.: 12/338,506

(22) Filed: Dec. 18, 2008

(65) Prior Publication Data

US 2010/0159987 A1 Jun. 24, 2010

(51) Int. Cl.
 *H04W 88/02* (2009.01)
(52) U.S. Cl. ...... 455/558; 455/551; 455/554.2; 235/375; 235/380; 235/429
(58) Field of Classification Search ........ 455/551, 455/558, 554, 2; 235/375, 429, 380
See application file for complete search history.

(56) References Cited

U.S. PATENT DOCUMENTS

| | | | |
|---|---|---|---|
| 6,763,399 B2 * | 7/2004 | Margalit et al. | 710/13 |
| 6,772,956 B1 * | 8/2004 | Leaming | 235/492 |
| 7,039,759 B2 * | 5/2006 | Cheng et al. | 711/115 |
| 7,213,766 B2 * | 5/2007 | Ryan et al. | 235/492 |
| 7,389,246 B1 * | 6/2008 | Ohrt | 705/4 |
| 7,427,217 B2 * | 9/2008 | Chou et al. | 439/660 |
| 7,856,249 B2 * | 12/2010 | Bloebaum | 455/558 |
| 2002/0177466 A1 * | 11/2002 | Laurila et al. | 455/552 |
| 2005/0221853 A1 * | 10/2005 | Silvester | 455/551 |
| 2007/0032122 A1 * | 2/2007 | Wang | 439/374 |
| 2008/0235520 A1 * | 9/2008 | Becker et al. | 713/189 |
| 2010/0248783 A1 * | 9/2010 | Jolivet | 455/558 |
| 2010/0312926 A1 * | 12/2010 | Arya et al. | 710/51 |

* cited by examiner

*Primary Examiner* — Linh Nguyen

(57) ABSTRACT

A USB based USIM or SIM device is disclosed. For example, the device comprises a Subscriber Identity Module (SIM) module, a SIM to Universal Serial Bus (USB) conversion module coupled to said SIM module, and a USB interface module coupled to said SIM to USB conversion module for engaging a computing device.

18 Claims, 3 Drawing Sheets

UNIVERSAL SERIAL BUS BASED SUBSCRIBER IDENTITY MODULE

The present invention relates generally to communication networks and, more particularly, to a Universal Serial Bus (USB) based Universal Integrated Circuit Card (UICC) hosting a Subscriber Identity Module (SIM) application for portable computing devices, e.g., personal digital assistant and laptop computers.

BACKGROUND OF THE INVENTION

Universal Subscriber Identity Module (USIM) card or Subscriber Identity Module (SIM) card are used in Universal Mobile Telecommunications System (UMTS) third generation (3G) and Global System for Mobile communications (GSM) second generation (2G) terminals, respectively, for providing mobile phone service portability and security credential management. Global System for Mobile communications (GSM) is a widely deployed standard and is used world wide for mobile phone communications. The GSM technology is also known as a second generation (2G) technology. Universal Mobile Telecommunications System (UMTS) is one of the third-generation (3G) standards for mobile phone communications.

Laptops and some portable computing devices presently have to have SIM or USIM cards embedded within the devices to obtain cellular services and thus tying the devices to a particular 2G or 3G cellular service provider at the time of manufacturing. This severely limits service portability across multiple devices because these embedded SIM or USIM cards are generally not user accessible.

In a different scenario, users may use a PC card with its own SIM or USIM slot to obtain cellular services and, thus, prevents factory-installed integrated wide-area wireless interface. In addition, most laptops currently have factory-installed Wi-Fi interfaces but users cannot use their SIM or USIM to pay for hotspot services without additional external readers and, thus, limiting Wi-Fi and cellular service bundling options. Wi-Fi is a wireless local area network (WLAN) technology based on the Institute of Electrical & Electronics Engineers (IEEE) 802.11 standards.

SUMMARY OF THE INVENTION

In one embodiment, the present invention disclosed a USB based USIM or SIM device. For example, the device comprises a Subscriber Identity Module (SIM) module, a SIM to Universal Serial Bus (USB) conversion module coupled to said SIM module, and a USB interface module coupled to said SIM to USB conversion module for engaging a computing device.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
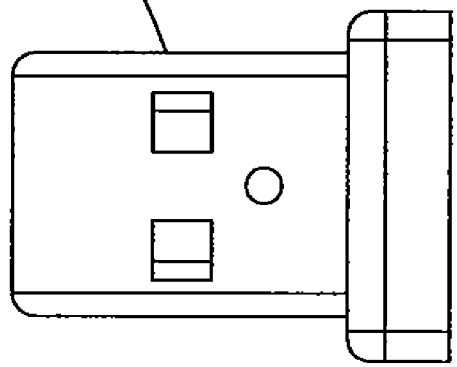
FIG. 1 illustrates an exemplary USB USIM/SIM device related to the present invention.
Figure 1:
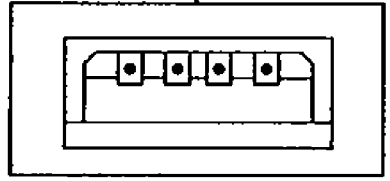

Universal Subscriber Identity Module (USIM) card or Subscriber Identity Module (SIM) card are used in Universal Mobile Telecommunications System (UMTS) third generation (3G) and Global System for Mobile communications (GSM) second generation (2G) terminals, respectively, for providing mobile phone service portability and security credential management.

As discussed above, although Laptops and some portable computing devices may have SIM or USIM cards embedded within the devices to obtain cellular services, this approach severely limits service portability across multiple devices because these embedded SIM or USIM cards are generally not user accessible.

To address this criticality, the present invention enables a USB based USIM or SIM device which is embedded with a UICC hosting a USIM and/or a SIM application and supports an external USB interface. For example, laptop computers generally do not have SIM/USIM reader slots, but USB ports are universally available on laptop computers. Since USB ports are widely available on portable computing devices, it is advantageous to combine SIM and USIM functions with a USB interface.

In one embodiment of the present invention, the Universal Integrated Circuit Card (UICC) device hosting the USIM and/or SIM applications is configured to be inserted into a USB port of a portable computing device with little or minimal protrusion and can enable universal access to USIM or SIM functionalities without limiting a USIM or SIM to a particular wireless interface or without limiting a portable computing device to a particular service provider. This enables general retail integration of wireless interfaces into portable computing devices without the limitation of having an unchangeable arrangement with a particular service provider or specific service plans. In other words, the USIM or SIM UICC of the present invention can be associated with a single account that is capable of being used with a plurality of different wireless interfaces and services such as Wi-Fi services, Universal Mobile Telecommunications System (UMTS) services, and Global System for Mobile communications (GSM) services that can be used across different devices.

It should be noted that the USB based UICC hosting the USIM and/or SIM applications of the present invention is an embedded system. Namely, the USIM or SIM UICC of the present invention is embedded within a USB based device. In other words, the USIM or SIM UICC is physically and permanently deployed within the USB based device. As such, the USIM or SIM UICC of the present invention is not a SIM reader that is capable of reading different SIM cards.

Since USB ports are ubiquitous in portable computing devices, especially laptop computers, the USB based USIM or SIM UICC of the present invention can be inserted in a USB port to support USIM or SIM functionalities. Since the USB based SIM or USIM device can be inserted into a USB port with little or minimal protrusion, the present invention can be left plugged into a laptop and used for different wireless interfaces and services.

For example, a standard SIM or USIM chip without its smartcard contacts is physically very small and can be integrated within a device also supporting the USB interface using the A-type male plug terminal USB connector. This is made small enough to fit completely inside a USB port on a laptop with little or minimal protrusion. In one embodiment, the USB based UICC hosting USIM or SIM applications may use a mechanical (e.g., spring loaded mechanism) or software controlled method for ejection.

In one embodiment, the present invention enables:

factory installed and integrated wireless interfaces without prior arrangements with specific service providers, e.g., a laptop with cellular service interface does not need to be tied to a particular service provider;

single account tied to a USB USIM or SIM can be used for different wireless interfaces and accounts such as Wi-Fi, UMTS, and GSM services that can be used across different devices;

access to account and credential information on USB USIM or SIM for various purposes by applications on the laptop, such as Internet Protocol Multimedia Subsystem (IMS) software, Voice over Internet Protocol (VoIP) client software, Short Message Service (SMS) software, and Multimedia Messaging Service (MMS) software, etc.

Subscriber Identity Module (SIM) is an application that can be deployed in a removable smart card or Integrated Circuit Card, also known as a SIM Card, that is typically designed for mobile telephone devices, such as GSM mobile phones. A SIM chip is embedded within a SIM card. SIM cards securely store the service subscriber and authentication information used to identify a service subscriber of GSM mobile service. The SIM card allows users to switch phones by simply removing the SIM card from one mobile phone and inserting it into another mobile phone without affecting the subscriber's telephone number.

Universal Subscriber Identity Module (USIM) is an application that can be deployed in a removable smart card or Integrated Circuit Card, also known as a USIM Card, that is typically designed for mobile telephone devices, such as UMTS mobile phones. USIM for UTMS services is the equivalent to SIM for GSM services.

To better understand the present invention, FIG. 1 illustrates an exemplary USB based USIM/SIM UICC device 100 related to the present invention. For example, view 110 provides a top view of the exemplary USB USIM/SIM device 100 with a USB interface and view 111 provides a side view of the USB interface of the exemplary USB USIM/SIM device related to the present invention. Note that the exemplary USB USIM/SIM UICC device can be inserted into an A-type USB jack with minimal protrusion.

Figure 2:
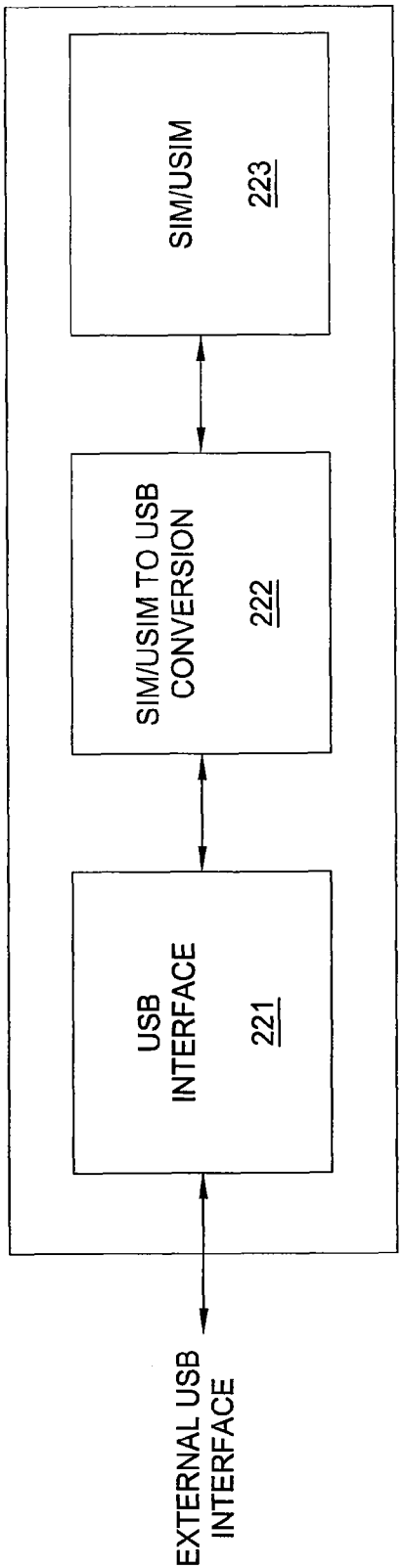
FIG. 2 illustrates a logical block diagram of a USB USIM/SIM device of the present invention.

FIG. 2 illustrates a logical functional diagram of the USB USIM/SIM UICC device 100 of the present invention. For example, USB USIM/SIM UICC device 100 may comprise three different functional blocks. USB interface functional block or module 221 provides all USB interface related functions and supports a standard external USB interface. For example, USB interface functional block or module 221 receives external electrical power using the standard USB interface and distributes the received power to the SIM/USIM to USB functional block 222 and the SIM/USIM functional block or module 223 for normal operations.

In one embodiment, SIM/USIM to USB functional block or module 222 provides all necessary functions to convert electrical signals passed between USB functional block or module 221 and the SIM/USIM functional block or module 223. In one embodiment, SIM/USIM functional block or module 223 provides SIM/USIM related functionalities, such as wireless service portability and security credential management.

Figure 3:
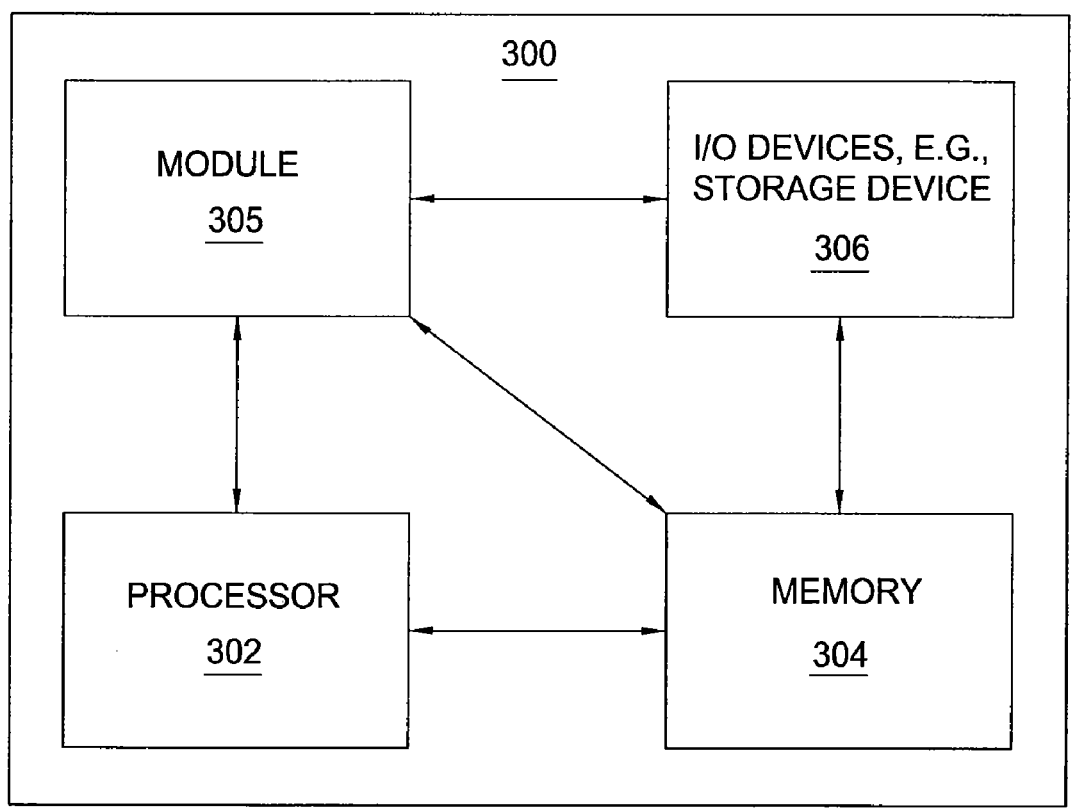
FIG. 3 illustrates a high level block diagram of a general purpose computer suitable for use in performing the functions described herein.

FIG. 3 depicts a high level block diagram of a general purpose computer, e.g., a laptop or a PDA, suitable for use in performing the functions described herein. As depicted in FIG. 3, the system 300 comprises a processor element 302 (e.g., a CPU), a memory 304, e.g., random access memory (RAM) and/or read only memory (ROM), a USB based SIM/USIM module 305, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device, comprising:
a subscriber identity module embedded within the device, wherein the subscriber identity module is for obtaining a mobile communication service from a telecommunications service provider;
a subscriber identity module to universal serial bus conversion module coupled to the subscriber identity module; and
a universal serial bus interface module coupled to the subscriber identity module to universal serial bus conversion module for engaging a computing device, wherein the device enables the obtaining of the mobile communication service without a prior arrangement with the telecommunications service provider.

2. The device of claim 1, wherein the computing device comprises a portable computing device.

3. The device of claim 2, wherein the portable computing device comprises a laptop computer.

4. The device of claim 1, wherein the subscriber identity module supports both subscriber identity module functions and universal subscriber identity module functions.

5. The device of claim 1, wherein the universal serial bus interface module is for engaging a universal serial bus jack.

6. The device of claim 1, wherein the device is associated with a single account that is capable of being used with a plurality of different wireless interfaces and services.

7. The device of claim 6, wherein the plurality of different wireless interfaces and services comprises a Wi-Fi service, a universal mobile telecommunications system service, and a global system for mobile communications service.

8. The device of claim 1, wherein the subscriber identity module to universal serial bus conversion module supports an electrical signal conversion for signals passed between the subscriber identity module and the universal serial bus interface module.

9. The device of claim 1, wherein the universal serial bus interface module distributes an externally received power to the subscriber identity module to universal serial bus conversion module and the subscriber identity module.

10. A device, comprising:
means for providing a subscriber identity module function embedded within the device, wherein the means for providing a subscriber identity module function is for obtaining a mobile communication service from a telecommunications service provider;

means for providing a subscriber identity module to universal serial bus conversion function coupled to the means for providing the subscriber identity module function; and means for providing a universal serial bus interface function coupled to the means for providing the subscriber identity module to universal serial bus conversion function for engaging a computing device, wherein the device enables the obtaining of the mobile communication service without a prior arrangement with the telecommunications service provider.

11. The device of claim 10, wherein the computing device comprises a portable computing device.

12. The device of claim 11, wherein the portable computing device comprises a laptop computer.

13. The device of claim 10, wherein the means for providing the subscriber identity module function supports both subscriber identity module functions and universal subscriber identity module functions.

14. The device of claim 10, wherein the means for providing the universal serial bus interface function is for engaging a universal serial bus jack.

15. The device of claim 10, wherein the device is associated with a single account that is capable of being used with a plurality of different wireless interfaces and services.

16. The device of claim 15, wherein the plurality of different wireless interfaces and services comprises a Wi-Fi service, a universal mobile telecommunications system service, and a global system for mobile communications service.

17. The device of claim 10, wherein the means for providing the subscriber identity module to universal serial bus conversion function supports an electrical signal conversion for signals passed between the means for providing the subscriber identity module function and the means for providing the universal serial bus interface function.

18. The device of claim 10, wherein the means for providing the universal serial bus interface function distributes an externally received power to the means for providing the subscriber identity module to universal serial bus conversion function and the means for providing the subscriber identity module function.

* * * * *